(12) United States Patent
Moyle

(10) Patent No.: US 9,482,488 B2
(45) Date of Patent: Nov. 1, 2016

(54) ILLUMINATED RETICLE SYSTEM FOR A RIFLESCOPE OR OTHER AIMED OPTICAL DEVICE

(71) Applicant: Leupold & Stevens, Inc., Beaverton, OR (US)

(72) Inventor: Thomas E. Moyle, Hillsboro, OR (US)

(73) Assignee: Leupold & Stevens, Inc., Beaverton, OR (US)

(*) Notice: Subject to any disclaimer, the term of this patent is extended or adjusted under 35 U.S.C. 154(b) by 0 days.

(21) Appl. No.: 14/596,027

(22) Filed: Jan. 13, 2015

(65) Prior Publication Data
US 2015/0198416 A1 Jul. 16, 2015

Related U.S. Application Data

(60) Provisional application No. 61/926,867, filed on Jan. 13, 2014.

(51) Int. Cl.
*F41G 1/34* (2006.01)
*G02B 23/00* (2006.01)
*F21V 8/00* (2006.01)

(52) U.S. Cl.
CPC ............. *F41G 1/345* (2013.01); *G02B 6/0008* (2013.01); *G02B 23/00* (2013.01)

(58) Field of Classification Search
CPC ..... F41G 1/345; G02B 6/0008; G02B 23/00; G02B 6/04; G02B 6/06; G02B 6/08; G02B 6/02042; G02B 6/262; G02B 23/2469; G02B 6/001; G02B 6/3885; G02B 6/0078; G02B 6/032; G02B 6/3897; G02B 6/4249; G02B 6/4471; G02B 23/14; G02B 27/0994; G02B 6/2938; G02B 6/3664; G02B 6/3672; G02B 6/3801; G02B 6/4452; G02B 6/448; G02B 7/025; G02B 23/2476; G02F 1/133524; G02F 2001/133562; G02F 1/0115
USPC ................... 359/428; 385/115–121
See application file for complete search history.

(56) References Cited

U.S. PATENT DOCUMENTS

| | | | |
|---|---|---|---|
| 5,924,234 A | 7/1999 | Bindon et al. | |
| 7,159,325 B2 | 1/2007 | Rager | |
| 7,296,358 B1 * | 11/2007 | Murphy | F41G 1/44 33/265 |
| 7,574,810 B1 | 8/2009 | LoRocco | |
| 8,869,784 B2 | 10/2014 | LoRocco et al. | |
| 2003/0086165 A1 | 5/2003 | Cross et al. | |

OTHER PUBLICATIONS

SI Staff, "Making Leupold's Best Even Better: VX-6 Gets FireDot Illumination", Jan. 27, 2012, http://www.shootingillustrated.com/articles/2012/1/27/making-leupolds-best-even-better-vx-6-gets-firedot-illumination/, captured Jan. 6, 2016.*

(Continued)

*Primary Examiner* — Bumsuk Won
*Assistant Examiner* — Wen Huang
(74) *Attorney, Agent, or Firm* — Stoel Rives LLP; Robert R. Teel

(57) ABSTRACT

An illuminable reticle supporting multiple optical fibers includes an electroformed foil or wire reticle segment providing a primary aiming mark; a first optical fiber having a first end, the first optical fiber being adhered to and overlaying a lower portion of the segment to provide a first illuminable aiming point along the primary aiming mark when the first optical fiber emits light from its first end; and a second optical fiber having a second end, the second optical fiber being adhered to and overlaying a lower portion of the first optical fiber to provide a second illuminable aiming point parallel with and below the first illuminable aiming point when the second optical fiber emits light from its second end.

18 Claims, 4 Drawing Sheets

(56) References Cited

OTHER PUBLICATIONS

Wakeman, "Leupold VX-6 2-12×42mm Firedot LR Reticle", archived at https://web.archive.org/web/20130806063311/http://www.chuckhawks.com/leupold_VX6_2-12x42.htm, archived Aug. 6, 2013.

Leupold & Stevens, Inc., "Enlarged View of Central Portion of FireDot® LR Duplex Illuminated Reticle", FireDot®-equipped VX-6 2-12×42mm Riflescope, Product Model No. 111980, available from Leupold & Stevens, Inc., https://www.leupold.com/reticles/firedot-lr-duplex-illuminated/, publicly available as early as Aug. 6, 2013.

* cited by examiner

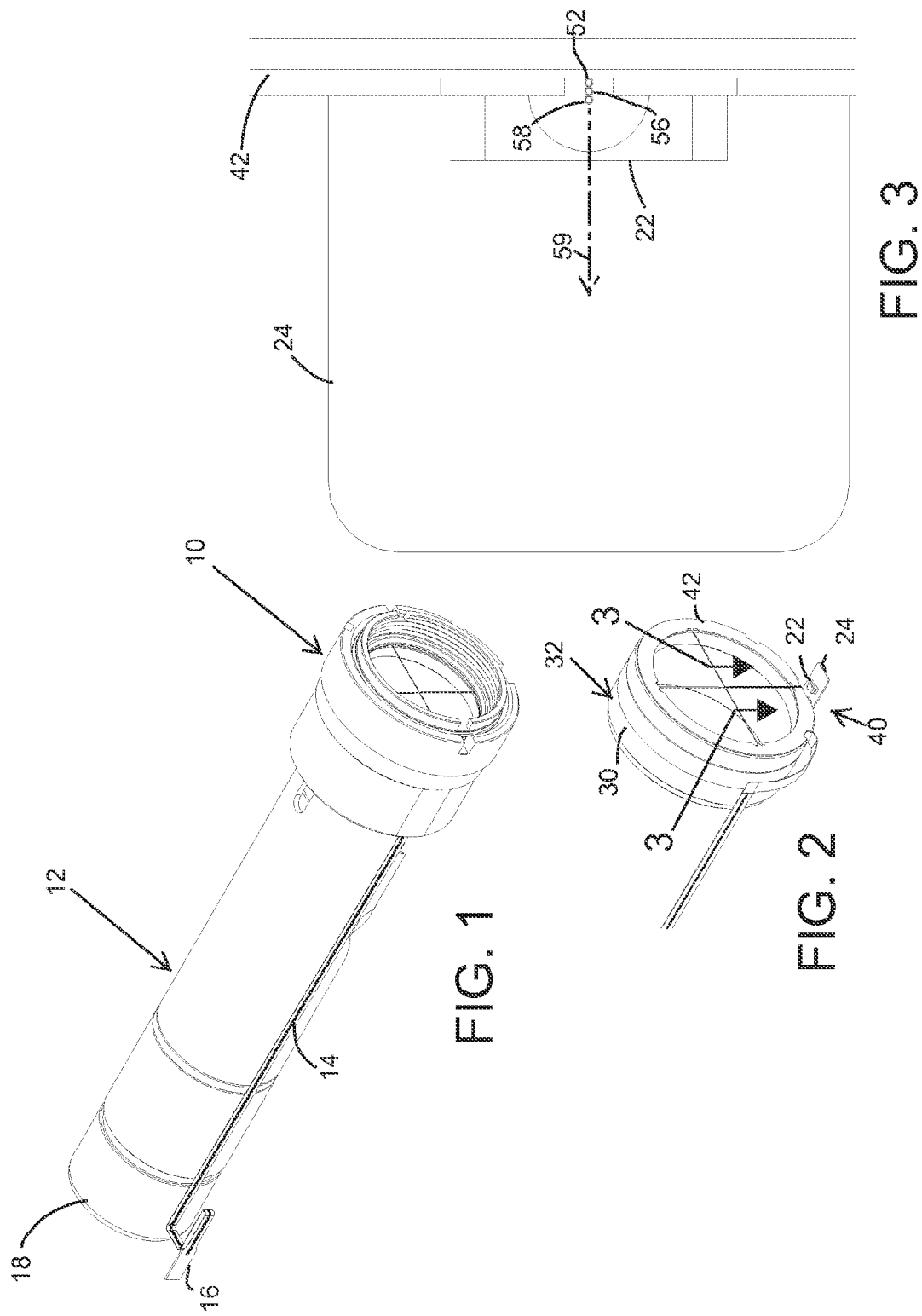

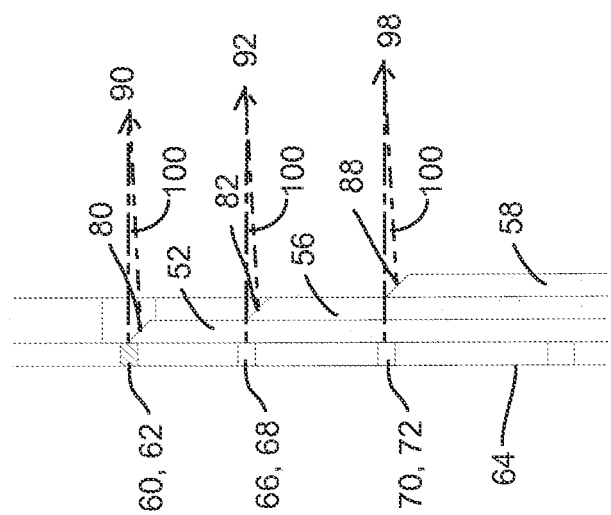
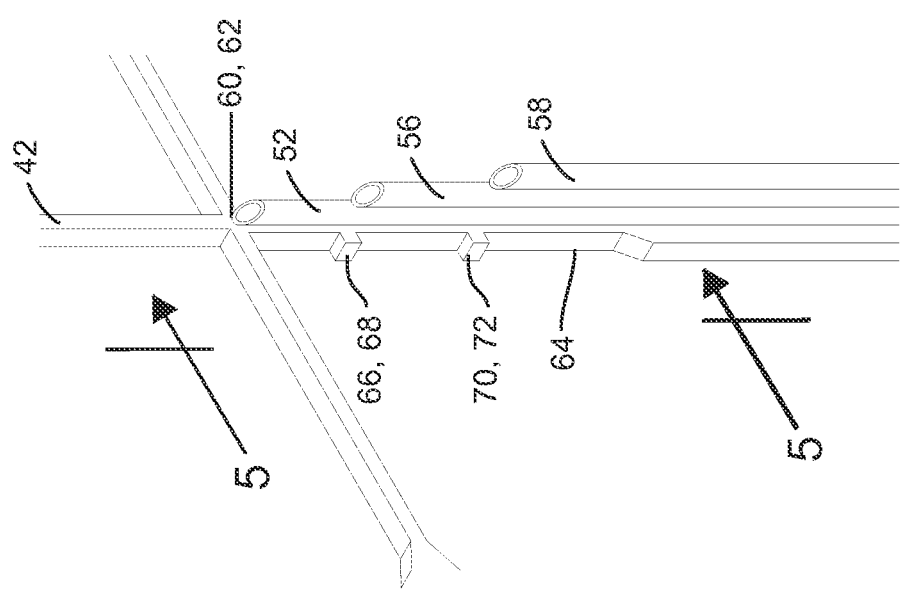

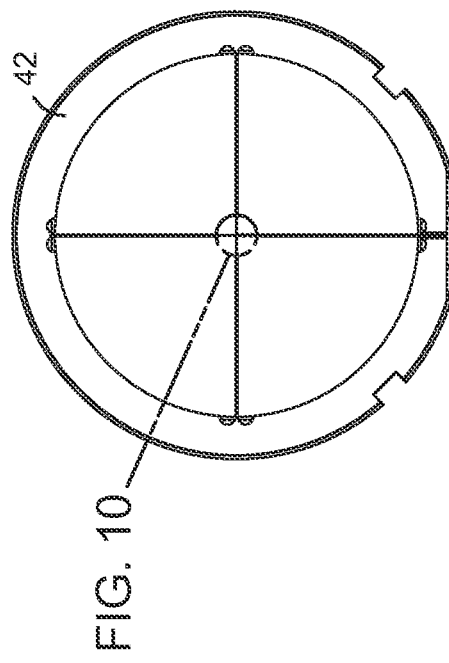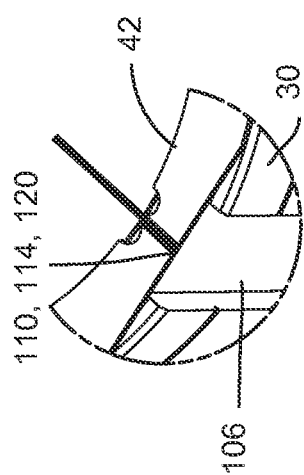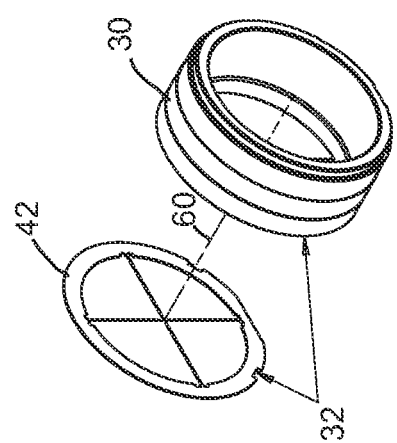

ILLUMINATED RETICLE SYSTEM FOR A RIFLESCOPE OR OTHER AIMED OPTICAL DEVICE

RELATED APPLICATION

The present application claims the benefit of U.S. Provisional Patent Application No. 61/926,867, filed Jan. 13, 2014, which is incorporated by reference herein in its entirety.

TECHNICAL FIELD

This disclosure generally relates to aiming devices such as riflescopes or spotting scopes, and, more particularly, to illuminable reticle systems for projectile-weapon aiming devices.

Background Information

Projectile-weapon aiming devices are discussed herein principally in the context of a telescopic aiming device rigidly affixed to a weapon and commonly embodied as a riflescope. A riflescope houses a reticle positioned between objective and eyepiece ends so that an observed target scene in a field of view of the riflescope is partly occluded by reticle aiming marks.

A reticle aiming mark defines an aiming point at which a straight aiming line of sight intersects at a discrete distance (so-called range or target distance) a bullet's or other projectile's curved trajectory. The curved trajectory is traversed by the projectile falling and decelerating while traveling from the weapon to the target location, and it depends on ballistic characteristics, such as projectile weight, drag, and initial velocity (e.g., muzzle velocity), and on other factors impacting external ballistics of an ammunition. Thus, the projectile, due to its curved trajectory, will intersect the aiming line of sight at one range and pass below or above it at other ranges. This necessitates the use of elevation adjustments to adjust the aiming line of sight for intersecting the curved trajectory at another target range.

Numerous reticle designs attempt to provide the shooter with a plurality of aiming marks for shooting at targets at various predetermined ranges, i.e., aiming marks producing line of sight/trajectory intersections at various target distances. Some of these include devices for approximating the range to the target. These riflescopes attempt to eliminate mechanical elevation adjustments in the riflescope to compensate for bullet drop at different ranges. Instead, the shooter merely aims with one of several holdover aiming marks on the reticle spaced below the primary crosshair. Example riflescopes employing reticles to facilitate such holdover aiming are described in U.S. Pat. No. 6,591,537 of Smith and U.S. Pat. No. 7,603,804 of Zaderey et al. These patents, for example, describe reticles having a series of secondary aiming marks spaced below a primary aiming mark and at predetermined intervals for compensating for the bullet path. The secondary aiming marks thereby provide holdover aiming points, which the shooter selects based on the secondary aiming mark that most closely corresponds to the observed range.

Unilluminated reticles become less effective in low-light conditions because less light enters the objective end, resulting in a darker field of view. The darker field of view makes it difficult for a shooter looking through the riflescope to distinguish reticle aiming marks from the observed target scene.

Illuminable reticle systems (so-called illuminated reticles) provide illuminated aiming marks and thereby improve the contrast between the reticle aiming marks and the observed target scene. Some illuminated reticles, such as ones described in U.S. Patent Application Publication No. 2003/0086165 of Cross, include a single optical fiber (referred to as a light pipe) that directs light to an electroform reticle made via conventional photolithographic processes on thin film nickel alloy. Other embodiments of the '165 publication include photoluminescent material deposited on the reticle. Also, some illuminated reticles include a disc of etched optical material that directs (e.g., refracts) light from an ambient or artificial illumination source toward an aiming point.

SUMMARY OF THE DISCLOSURE

An illuminable reticle supporting multiple optical fibers has a vertical electroformed foil, a first optical fiber adhered to and overlaying a lower portion of the vertical electroformed foil to provide a first illuminable aiming point when the first optical fiber transmits light provided by a first illumination source (e.g., a light emitting diode), and a second optical fiber adhered to and overlaying a lower portion of the first optical fiber to provide a second illuminable aiming point when the second optical fiber transmits light provided by a second illumination source (e.g., the aforementioned light emitting diode or a second LED).

According to one embodiment, a reticle system includes a crosshair aiming mark providing a crosshair aiming point, and the first illuminable aiming point is configured to be perceived at a location of the crosshair aiming point. In another embodiment, the reticle system includes a first holdover aiming mark providing a first holdover aiming point below the crosshair aiming point, and the second illuminable aiming point is configured to be perceived at a location of the first holdover aiming point.

According to a further embodiment, the reticle system includes a reticle body having a reticle crosshair (e.g., a metal thread or wire segment, or an electroformed foil) spanning a field of view. In a further embodiment, the first optical fiber is stacked on the reticle crosshair so that the first optical fiber does not occlude any portion of an observable target scene that is not also occluded by the reticle crosshair. In still another embodiment, the second optical fiber is stacked on the first optical fiber so that the second optical fiber does not occlude any portion of the scene that is not occluded by the reticle crosshair.

According to another embodiment, the reticle system includes a metal wire reticle, an electroform reticle, or a glass reticle, and the reticle body is a glass substrate.

Additional aspects and advantages will be apparent from the following detailed description of embodiments, which proceeds with reference to the accompanying drawings.

BRIEF DESCRIPTION OF THE DRAWINGS

FIG. 1 is an isometric view of a riflescope reticle housing retaining an illuminable reticle system, an erector lens system main tube extending from the reticle housing, and a flex circuit extending along the length of the main tube.

FIG. 2 is an isometric fragmentary view of a reticle assembly in spatial alignment with a surface-mount LED light source that is electrically connected to a pad of the flex circuit of FIG. 1 and positioned to illuminate three optical fibers stacked and vertically staggered on a lower primary vertical duplex thread of an electroform reticle of FIG. 1.

FIG. 3 is an enlarged section view taken along line 3-3 of FIG. 2, showing the three stacked optical fibers positioned to receive light from the LED and stacked along a vertical plane that is parallel to (or defines) a vertical plane passing through an optical axis.

FIG. 4 is an enlarged fragmentary isometric view of the reticle of FIG. 1, showing in greater detail the position of the three stacked, cladded optical fibers with respect to three aiming marks of the reticle.

FIG. 5 is a section view taken along line 5-5 of FIG. 4.

FIG. 6 is an exploded isometric view of the reticle assembly including the electroform reticle being rotatably and spatially aligned with its reticle case preparatory to installation of three optical fibers.

FIG. 8 is a front elevation view of the reticle assembly of FIG. 6 after application of optical fibers.

FIG. 9 is an enlarged fragmentary isometric view taken from an area indicated in FIG. 8, showing a base of the reticle assembly having a notched region sized to accommodate the LED of FIGS. 2 and 3, and showing the three optical fibers having ends cut at an edge of the notched region for receiving light from the LED.

DETAILED DESCRIPTION OF EMBODIMENTS

Figure 10:
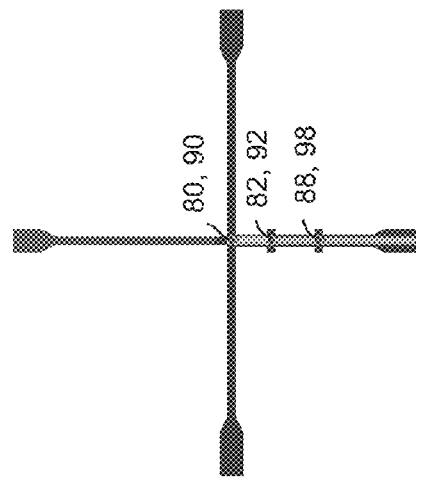
FIG. 10 is an enlarged fragmentary front elevation view taken from a detail indicated in FIG. 8, showing details of a central portion of the reticle, including the first optical fiber positioned at a primary crosshair and the second and third optical fibers positioned at respective secondary aiming holdover marks, thereby providing three illuminated aiming points that are red in color.

FIG. 1 shows riflescope components including a reticle housing 10, an erector lens system main tube 12 extending from the reticle housing 10, and a flex circuit 14. The flex circuit 14 extends along the length of the main tube 12, away from an electrical connection point 16 near an objective end 18 of the main tube 12, and to an LED 22 (FIG. 2) on a pad 24 located between the reticle housing 10 and a reticle case 30 of a reticle assembly 32. The reticle case 30 holds an illuminable reticle system 40 that includes an electroform foil reticle 42 carrying first, second, and third optical fibers 52, 56, and 58 (FIG. 3), which are stacked along a plane parallel to (i.e., defining) a vertical plane through an optical axis 59 in an optical path of the riflescope's field of view. The fibers 52, 56, and 58 are also vertically staggered on the reticle 42, as best shown in FIGS. 4 and 5.

FIG. 4 shows that the fibers 52, 56, and 58 each have a cladded surface that inhibits light from escaping the respective fiber through its cylindrical side surface. In particular, the cladding of the fiber 56 inhibits light from escaping its first side bonded to a confronting side of the fiber 52, or from escaping its side surface bonded to a confronting side of the fiber 58. In other embodiments, an adhesive may be used so that, once the adhesive is cured, it changes the refractive index of the fibers' surfaces so as to inhibit light from escaping one surface and entering an adjacent surface. Inhibiting optical crosstalk is advantageous when multiple optical fibers each transmit a distinct color of light.

FIG. 4 also shows that the reticle 42 includes a crosshair aiming mark 60 defining a crosshair aiming point 62, and a lower primary vertical duplex thread 64. The thread 64 includes a first holdover aiming mark 66 defining a first holdover aiming point 68, and second holdover aiming mark 70 defining a second holdover aiming point 72.

FIG. 5 shows that the fibers 52, 56, and 58 have 45° cut and polished beveled faces 80, 82, 88 that are vertically staggered at locations corresponding to the aiming marks 60, 66, and 70. The faces 80, 82, and 88 are each rotated about the length of their corresponding fibers (during installation of the fibers 52, 56, and 58) so that the faces 80, 82, and 88 face away from the thread 64 and expose the faces 80, 82, 88 to a riflescope eyepiece (not shown). The faces 80, 82, and 88 are rotated until the perceived brightness of each of illuminable aiming points 90, 92, and 98 is maximized. Additionally, the faces 80, 82, and 88 are vertically staggered at locations that are slightly below the centers of their corresponding aiming marks 60, 66, and 70 because light exiting the faces 80, 82, and 88 is refracted at an angle 100 and received by a shooter's eye (not shown) at locations corresponding to the aiming points 62, 68, and 72. Consequently, a shooter may zero the aiming marks 60, 66, and 70 while the reticle 42 is not illuminated, which simultaneously calibrates target ranges of the illuminable aiming points 90, 92, and 98.

The following four paragraphs describe details of slacking, vertically staggering, and illuminating the fibers 52, 56, and 58.

Figure 7:
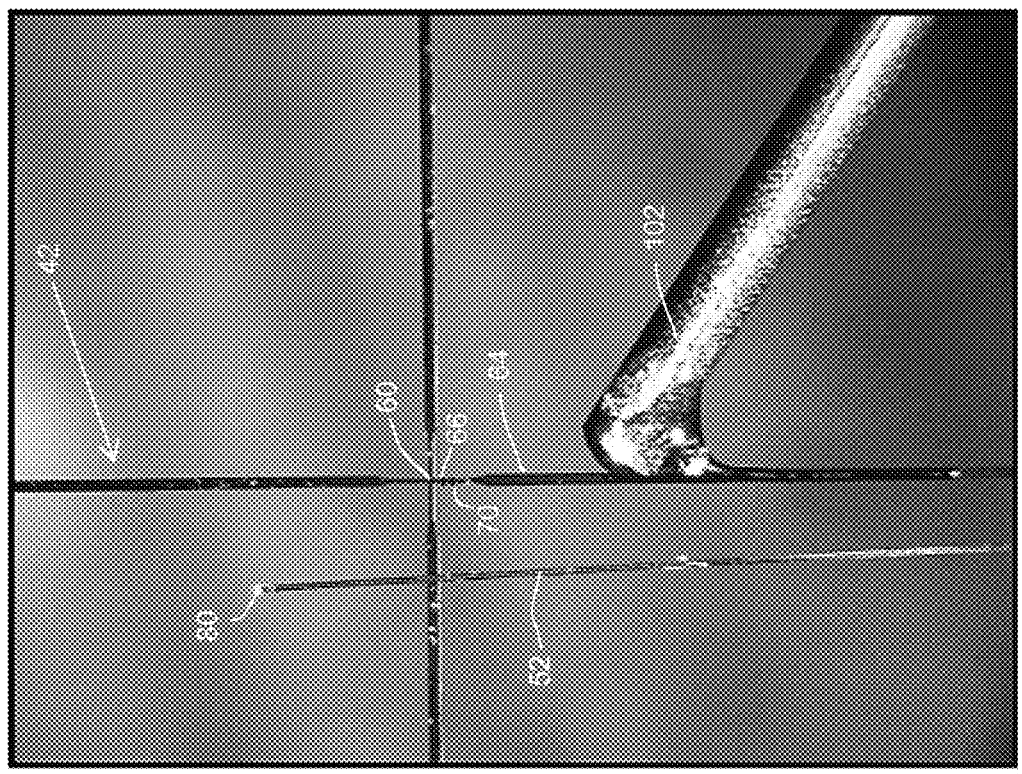
FIG. 7 is a pictorial view showing application of adhesive to the lower duplex thread for adhering to it the first optical fiber having an illuminated terminal end that will be located proximal a crosshair aiming mark of the reticle.

FIG. 6 shows the bare electroform reticle 42 (i.e., the reticle 42 prior to installation of optical fibers) being aligned with its reticle case 30 preparatory to installation of the fibers 52, 56, and 58. FIG. 7 shows application of adhesive to thread 64 for adhering the thread 64 to the first optical fiber 52. As noted, the face 80 is illuminated during installation. An applicator 102 is used to apply a premeasured amount of medium viscosity adhesive designed for impact-resistant glass and metal bonding. According to one embodiment, an acrylic ultraviolet light (UV) curing adhesive, such as Loctite® 3494™ available from Henkel Corporation of Düsseldorf, Germany, is applied with the applicator 102. With the adhesive applied, the fiber 52 is then positioned, and the adhesive is cured using a UV lamp that exposes the adhesive to UV light.

FIGS. 8 and 9 show that the installed fiber 52 is cut at a notched region 106 of the reticle case 30. Similarly, the second fiber 56 is positioned (i.e., stacked) on the first fiber 52, rotated, glued, and cut. The third fiber 58 is positioned on the second fiber 56, rotated, glued, and cut. Accordingly, there are three cut ends 110, 114, 120: one cut end for each of respective fibers 52, 56, and 58.

The notched region 106 is sized to accommodate the LED 22, as shown in FIG. 2. The LED 22 produces light—which FIG. 10 shows as red in color—for transmission through the fibers 52, 56, and 58 from the cut ends 110, 114, and 120 to the faces 80, 82, and 88 that direct the light into the optical path and toward a shooter's eye to establish aiming points 90, 92, and 98 that are shown as illuminated in FIG. 10.

In other embodiments, each one of the cut ends 110, 114, and 120 may be isolated to confront an individual LED, and each individual LED may have a color that is different from the other LEDs.

It will be understood by skilled persons that many changes may be made to the details of the above-described embodiments without departing from the underlying principles of the present disclosure. The scope of the present invention should, therefore, be determined only by the following claims.

The invention claimed is:

1. A reticle system for a telescopic sighting device having an optical path and defining a field of view, the reticle system comprising:
a reticle body for supporting multiple optical fibers and having a reticle crosshair spanning the field of view;
a first optical fiber of the multiple optical fibers, the first optical fiber including:
a first fiber segment;
a first surface having a first side and a second side opposite the first side, the first side being bonded directly to the reticle body along a portion of the reticle crosshair, the first side being parallel to the reticle crosshair; and
a first terminal end that, when located in the optical path of the telescopic sighting device, emits first light into the optical path to establish a first illuminated aiming point when the first light is provided by a first illumination source and is transmitted through the first optical fiber to the first terminal end;
a second optical fiber of the multiple optical fibers, the second optical fiber including:
a second fiber segment;
a second surface having a third side, the third side being bonded directly to the second side along a portion of the first fiber segment of the first optical fiber, the third side being parallel to the reticle crosshair; and
a second terminal end that, when located in the optical path of the telescopic sighting device, emits second light into the optical path to establish a second illuminated aiming point when the second light is provided by a second illumination source and is transmitted through the second optical fiber to the second terminal end, the second illuminated aiming point being spaced apart vertically from the first illuminated aiming point; and
the first optical fiber and the second optical fiber each having a width that is narrower than that of the reticle crosshair.

2. A riflescope including the reticle system of claim 1.

3. The reticle system of claim 1, in which the first light is a first color and the second light is a second color that is different from the first color.

4. The reticle system of claim 1, in which the first light is red in color.

5. The reticle system of claim 1, in which the reticle crosshair comprises a wire crosshair that is vertically oriented with respect to the field of view.

6. The reticle system of claim 1, in which the reticle crosshair comprises an electroformed vertical crosshair and an electroformed horizontal crosshair.

7. The reticle system of claim 1, in which the first side is adhesively bonded to the reticle crosshair.

8. The reticle system of claim 1, in which the second side and the third side are adhesively bonded to each other.

9. The reticle system of claim 1, in which the reticle crosshair comprises a first vertical holdover aiming mark and a second vertical holdover aiming mark, in which the first illuminated aiming point is superimposed in the field of view onto a first visible location of the first vertical holdover aiming mark, and in which the second illuminated aiming point is superimposed in the field of view onto a second visible location of the second vertical holdover aiming mark.

10. The reticle system of claim 1, in which the first illumination source and the second illumination source comprise a light emitting diode.

11. The reticle system of claim 1, further comprising:
an electroformed foil reticle segment comprising a portion of the reticle body providing a primary aiming mark; and
a bonded stack of the multiple optical fibers.

12. A riflescope including the reticle system of claim 11.

13. The reticle system of claim 11, in which the electroformed foil reticle segment includes a vertical crosshair.

14. The reticle system of claim 13, in which the electroformed foil reticle segment includes a horizontal crosshair.

15. The reticle system of claim 14, in which the horizontal crosshair and the vertical crosshair establish a crosshair aiming mark, and in which the first illuminated aiming point is below an aiming point of the crosshair aiming mark.

16. The reticle system of claim 11, in which the electroformed foil reticle segment comprises a first vertical holdover aiming mark and a second vertical holdover aiming mark, in which the first illuminated aiming point is superimposed in the field of view onto a first visible location of the first vertical holdover aiming mark, and in which the second illuminated aiming point is superimposed in the field of view onto a second visible location of the second vertical holdover aiming mark.

17. The reticle system of claim 11, in which the electroformed foil reticle segment subtends an angle in the field of view that encompasses an angle subtended by the width of the first optical fiber and the second optical fiber.

18. The reticle system of claim 11, in which the bonded stack of the multiple optical fibers are adhered to the electroformed foil reticle segment so that ends of the multiple optical fibers are staggered below the primary aiming mark.

* * * * *